US009816711B2

(12) United States Patent
Billman et al.

(10) Patent No.: US 9,816,711 B2
(45) Date of Patent: *Nov. 14, 2017

(54) AIR CONDITIONER UNIT AND METHOD FOR OPERATING SAME

(71) Applicant: Haier US Appliance Solutions, Inc., Wilmington, DE (US)

(72) Inventors: David William Billman, Louisville, KY (US); Richard Dustin Henderson, La Grange, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 417 days.

This patent is subject to a terminal disclaimer.

(21) Appl. No.: 14/468,841

(22) Filed: Aug. 26, 2014

(65) Prior Publication Data

US 2016/0061466 A1 Mar. 3, 2016

(51) Int. Cl.
| | |
|---|---|
| F25B 29/00 | (2006.01) |
| F24H 3/02 | (2006.01) |
| H05B 3/02 | (2006.01) |
| H05B 1/02 | (2006.01) |
| B60H 1/00 | (2006.01) |
| B60H 1/22 | (2006.01) |
| F24F 1/00 | (2011.01) |
| F24F 11/00 | (2006.01) |

(Continued)

(52) U.S. Cl.
CPC .......... *F24F 1/0007* (2013.01); *F24F 11/008* (2013.01); *F24F 11/0079* (2013.01); *F24F 11/022* (2013.01); *F24F 11/06* (2013.01); *F24F 2011/0038* (2013.01); *F24F 2011/0052* (2013.01); *Y02B 30/746* (2013.01)

(58) Field of Classification Search
CPC .... F24F 11/0076; F24F 11/0079; F24F 1/022; B60H 1/2218; F25B 2600/11; F25B 2600/111; F25B 2600/112
USPC ........ 219/480, 483, 486, 494, 539; 237/2 A; 165/64, 121
See application file for complete search history.

(56) References Cited

U.S. PATENT DOCUMENTS

| | | | | |
|---|---|---|---|---|
| 6,109,532 A | * | 8/2000 | Schindler | B60H 1/2218 237/2 A |
| 6,504,338 B1 | * | 1/2003 | Eichorn | G05D 7/0676 236/DIG. 9 |
| 7,911,776 B2 | | 3/2011 | Ikeda et al. | |

(Continued)

FOREIGN PATENT DOCUMENTS

| | | |
|---|---|---|
| JP | 07063405 A | 3/1995 |
| JP | 07-233996 | 9/1995 |

(Continued)

*Primary Examiner* — Len Tran
*Assistant Examiner* — Paul Alvare
(74) *Attorney, Agent, or Firm* — Dority & Manning, P.A.

(57) ABSTRACT

Air conditioner units and methods for operating air conditioner units are provided. A method includes determining an operational state of each heater bank of a plurality of heater banks of the air conditioner unit, and determining a speed of a blower fan of the air conditioner unit when the operational state of every heater bank is active. The method further includes comparing a blower fan input voltage to a voltage threshold value when the speed is a low speed, and deactivating one of the plurality of heater banks when the blower fan input voltage is less than the voltage threshold value.

18 Claims, 4 Drawing Sheets

(51) Int. Cl.
*F24F 11/02* (2006.01)
*F24F 11/06* (2006.01)

(56) References Cited

U.S. PATENT DOCUMENTS

| | | | |
|---|---|---|---|
| 8,746,584 B2* | 6/2014 | Helt | F24D 19/1009 165/240 |
| 2009/0293760 A1* | 12/2009 | Kumar | B60L 1/003 105/59 |
| 2010/0212861 A1 | 8/2010 | Setsu et al. | |
| 2012/0053738 A1* | 3/2012 | Lingrey | F24F 11/0012 700/278 |
| 2012/0241140 A1* | 9/2012 | MacDonald | G06F 1/206 165/278 |

FOREIGN PATENT DOCUMENTS

| | | |
|---|---|---|
| JP | 07286746 A | 10/1995 |
| JP | 2004190900 A | 7/2004 |
| JP | 2009 024966 A | 2/2009 |
| KR | 20120052728 A | 5/2012 |

\* cited by examiner

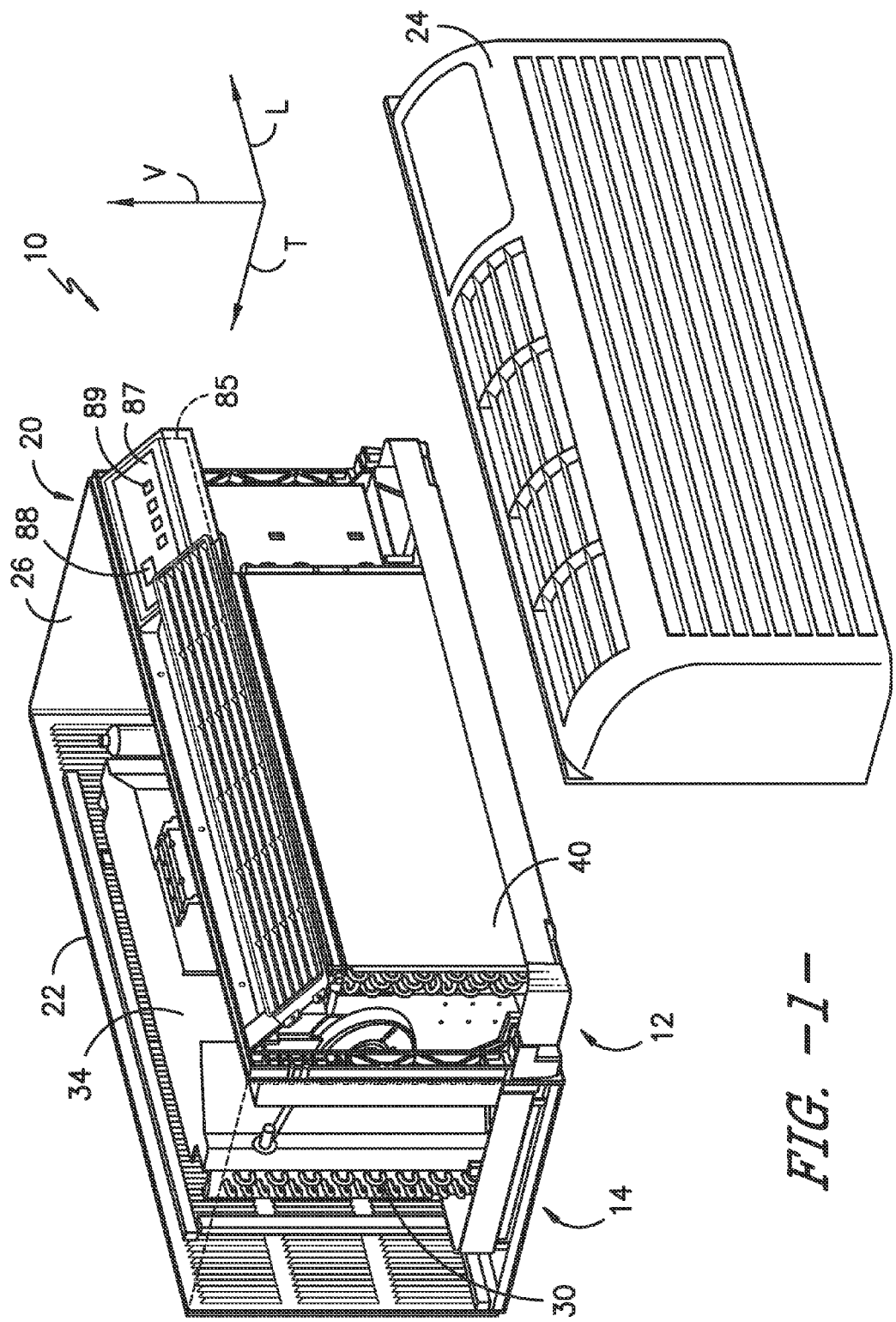
FIG. -1-

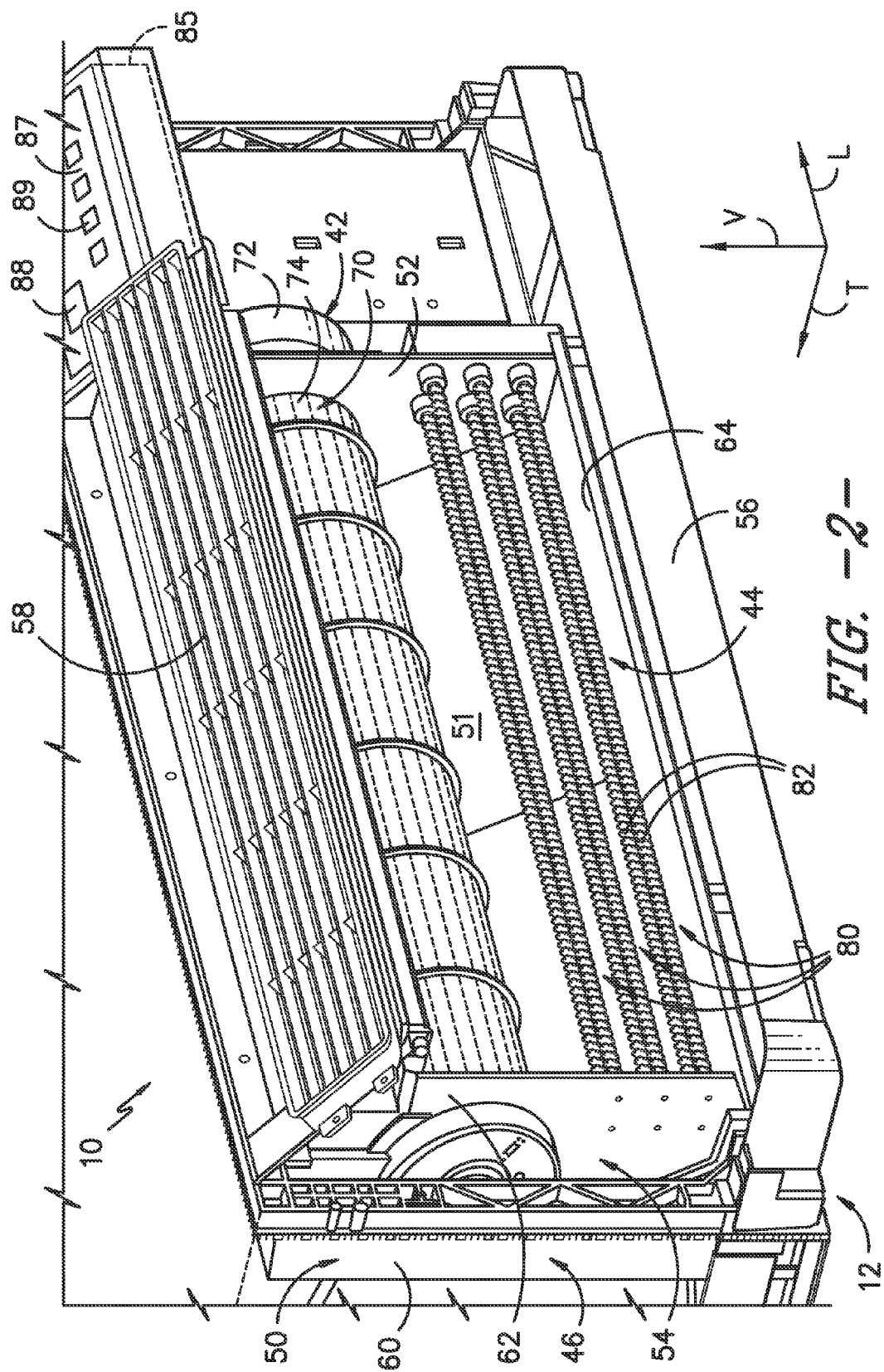

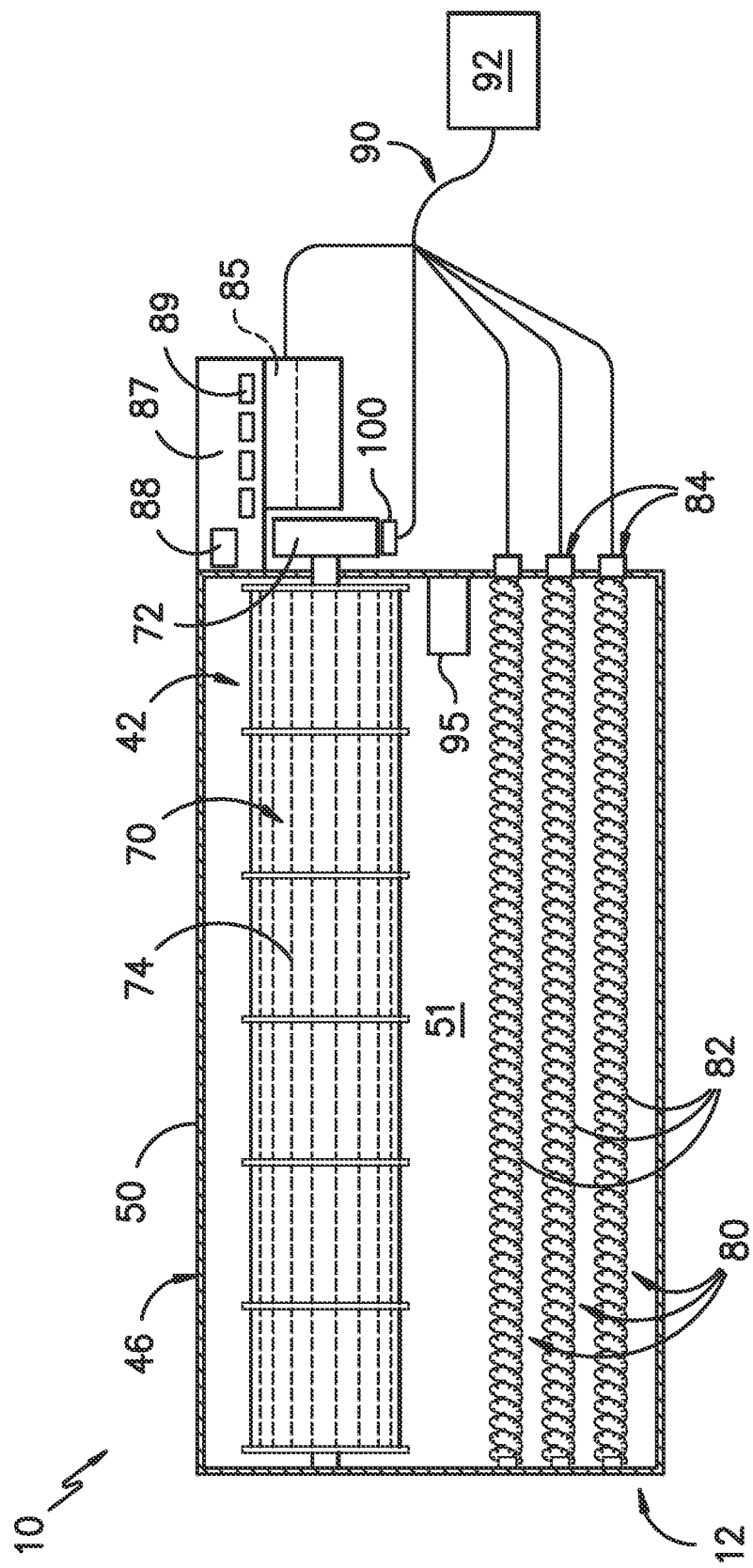
FIG. -3-

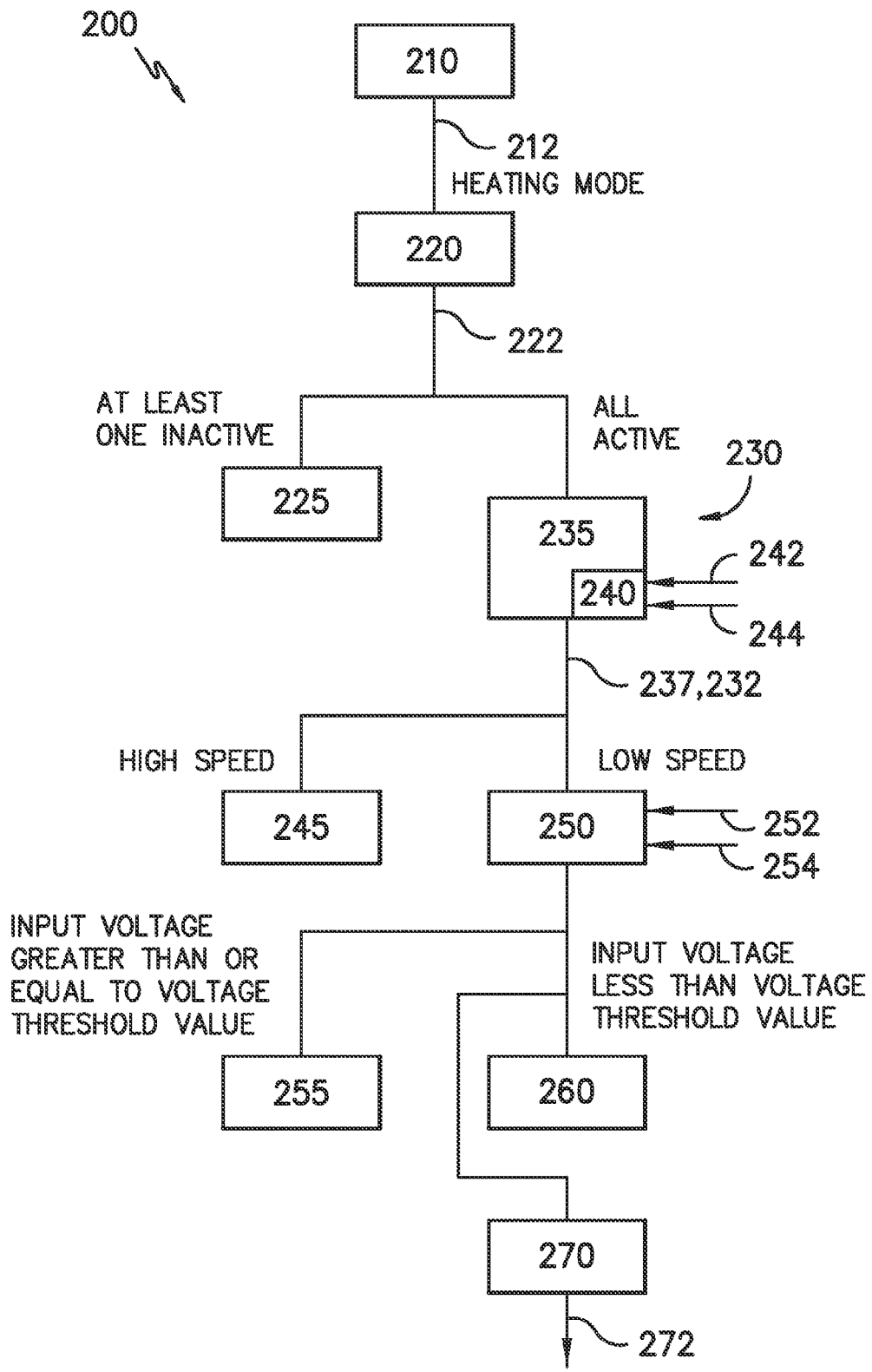
FIG. -4-

AIR CONDITIONER UNIT AND METHOD FOR OPERATING SAME

FIELD OF THE INVENTION

The present disclosure relates generally to air conditioner units, and more particularly to methods and apparatus for reducing or eliminating overheating of air conditioner units during heating operations.

BACKGROUND OF THE INVENTION

Air conditioner units are conventionally utilized to adjust the temperature within structures such as dwellings and office buildings. In particular, one-unit type room air conditioner units may be utilized to adjust the temperature in, for example, a single room or group of rooms of a structure. A typical such air conditioner unit includes an indoor portion and an outdoor portion. The indoor portion is generally located indoors, and the outdoor portion is generally located outdoors. Accordingly, the air conditioner unit generally extends through a wall, window, etc. of the structure.

In the outdoor portion of a conventional air conditioner unit, a compressor that operates a refrigerating cycle is provided. At the back of the outdoor portion, an outdoor heat exchanger connected to the compressor is disposed, and facing the outdoor heat exchanger, an outdoor fan for cooling the outdoor heat exchanger is provided. At the front of the indoor portion of a conventional air conditioner unit, an air inlet is provided, and above the air inlet, an air outlet is provided. A blower fan and a heating unit are additionally provided in the indoor portion. Between the blower fan and heating unit and the air inlet, an indoor heat exchanger connected to the compressor is provided.

When cooling operation starts, the compressor is driven to operate the refrigerating cycle, with the indoor heat exchanger serving as a cold-side evaporator of the refrigerating cycle, and the outdoor heat exchanger as a hot-side condenser. The outdoor heat exchanger is cooled by the outdoor fan to dissipate heat. As the blower fan is driven, the air inside the room flows through the air inlet into the air passage, and the air has its temperature lowered by heat exchange with the indoor heat exchanger, and is then blown into the room through the air outlet. In this way, the room is cooled.

When heating operation starts, the heating unit is operated to raise the temperature of air in the air passage. The air, having had its temperature raised, is blown out through the air outlet into the room to heat the room.

In many currently known air conditioner units, the heating unit is formed from a plurality of heater banks. Each bank may have a different rated power output. The highest output for the unit generally occurs when all heater banks are operating at the same time. Additionally, many currently known air conditioner units have multiple blower fan speed settings. For example, a blower fan may in some cases be operated at a low setting or a high setting, or in some cases at various other intermediate settings.

One concern during operation of air conditioner units is overheating of the unit, particularly if a blockage occurs. For example, a blockage to the air inlet path and/or air outlet path prevents proper airflow from occurring within the unit. Particularly when all heater banks are on and the fan speed is low, temperatures within the unit can rise significantly, leading to deformation and/or other damage to components of the unit. Particularly vulnerable components include, for example, plastic components of the heater housing.

Accordingly, improved methods and apparatus for operating air conditioner units are desired. In particular, methods and apparatus that reduce or prevent overheating of the air conditioner unit would be advantageous.

BRIEF DESCRIPTION OF THE INVENTION

Aspects and advantages of the invention will be set forth in part in the following description, or may be obvious from the description, or may be learned through practice of the invention.

In accordance with one embodiment, a method for operating an air conditioner unit is provided. The method includes determining an operational state of each heater bank of a plurality of heater banks of the air conditioner unit, and determining a speed of a blower fan of the air conditioner unit when the operational state of every heater bank is active. The method further includes comparing a blower fan input voltage to a voltage threshold value when the speed is a low speed, and deactivating one of the plurality of heater banks when the blower fan input voltage is less than the voltage threshold value.

In accordance with another embodiment, an air conditioner unit is provided. The air conditioner unit includes a blower fan, the blower fan comprising a blade assembly and a motor connected to the blade assembly. The air conditioner unit further includes a heating unit, the heating unit comprising a plurality of heater banks. The air conditioner unit further includes a power source in electrical communication with the blower fan motor and the plurality of heater banks, and a controller in operable communication with the motor and the plurality of heater banks. The controller is operable for determining an operational state of each heater bank, determining a speed of the blower fan when the operational state of every heater bank is active, comparing a blower fan input voltage to a voltage threshold value when the speed is a low speed, and deactivating one of the plurality of heater banks when the blower fan input voltage is less than the voltage threshold value.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a perspective view of an air conditioner unit, with a room front exploded from a remainder of the air conditioner unit for illustrative purposes, in accordance with one embodiment of the present disclosure;

FIG. 2 is a perspective view of components of an indoor portion of an air conditioner unit in accordance with one embodiment of the present disclosure;

FIG. 3 is a schematic diagram of components of an air conditioner unit in accordance with one embodiment of the present disclosure; and FIG. 4 is a flow chart illustrating steps of a method in accordance with one embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIG. 1, an air conditioner unit 10 is provided. The air conditioner unit 10 is a one-unit type air conditioner, also conventionally referred to as a room air conditioner. The unit 10 includes an indoor portion 12 and an outdoor portion 14, and generally defines a vertical direction V, a lateral direction L, and a transverse direction T. Each direction V, L, T is perpendicular to each other, such that an orthogonal coordinate system is generally defined.

A housing 20 of the unit 10 may contain various other components of the unit 10. Housing 10 may include, for example, a rear grill 22 and a room front 24 which may be spaced apart along the transverse direction by a wall sleeve 26. The rear grill 22 may be part of the outdoor portion 14, which the room front 24 is part of the indoor portion 12. Components of the outdoor portion 14, such as an outdoor heat exchanger 30, outdoor fan (not shown), and compressor (not shown) may be housed within the wall sleeve 26. A casing 34 may additionally enclose the outdoor fan, as shown.

Referring now also to FIGS. 2 and 3, indoor portion 12 may include, for example, an indoor heat exchanger 40, a blower fan 42, and a heating unit 44. These components may, for example, be housed behind the room front 24. Additionally, a heater housing 46 may generally support and/or house various other components or portions thereof of the indoor portion 12, such as the blower fan 42 and the heating unit 44.

Heater housing 46 may have peripheral surfaces 50 that define a housing interior 51. For example, the peripheral surfaces 50 may include a first sidewall 52 and a second sidewall 54 which are spaced apart along the lateral direction L. Peripheral surfaces 50 may additionally include a base pan 56 and an outlet air diverter 58, each of which may extend between the sidewalls 52, 54 along the lateral direction L.

The housing 46 may be formed from one or more components. For example, in exemplary embodiments, the housing 46 may be formed from a bulkhead 60 and a shroud 62. The bulkhead 60 may in some embodiments be formed from a suitable plastic, or alternatively may be formed from any suitable material. The shroud 62 may in some embodiments be formed from a suitable metal, or alternatively may be formed from any suitable material. The shroud 62 may be connected to the bulkhead 60, and the bulkhead 60 and shroud 62 may together include the peripheral surfaces 50. For example, base pan 56 and outlet air diverter 58 may be components of the bulkhead 60, and portions of or entire sidewalls 52, 54 may be components of the shroud 62. Shroud 62 may additionally include an interior shroud base 64, which may for example be disposed within interior 51 adjacent base pan 56.

In exemplary embodiments, blower fan 42 may be a tangential fan. Alternatively, however, any suitable fan type may be utilized. Blower fan 42 may include a blade assembly 70 and a motor 72. The blade assembly 70, which may include one or more blades disposed within a fan housing 74, may be disposed within the interior 51 of the heater housing 46. As shown, blade assembly 70 may for example extend along the lateral direction L between the first sidewall 52 and the second sidewall 54. The motor 72 may be connected to the blade assembly 70, such as through the housing 74 to the blades via a shaft. Operation of the motor 72 may rotate the blades, thus generally operating the blower fan 42. Further, in exemplary embodiments, motor 72 may be disposed exterior to the heater housing 46. Accordingly, the shaft may for example extend through one of the sidewalls 52, 54 to connect the motor 72 and blade assembly 70.

Heating unit 44 in exemplary embodiments includes one or more heater banks 80. Each heater bank 80 may be individually powered, separately from other heater banks 80, to provide heat. In exemplary embodiments, three heater banks 80 may be utilized. Further, each heater bank 80 may in some embodiments have a different rated power level. For example in some embodiments, a heating unit 44 may include a low power heater bank, a medium power heater bank, and a high power heater bank. In some specific embodiment, heating unit 44 include a 1000 Watt bank 80, a 1400 Watt bank 80, and a 2400 Watt bank 80. Each heater bank 80 may further include at least one heater coil or coil pass 82, such as in exemplary embodiments two heater coils or coil passes 82. As show, in exemplary embodiments multiple heater banks 80 may be stacked vertically, and the coils 82 of a heater bank 80 may be arranged side-by-side. Accordingly, in exemplary embodiments wherein each heater bank 80 has two heater coils 82 the coils 82 may be arranged in two columns and three rows as shown.

The operation of air conditioner unit 10 including blower fan 42, heater banks 80, heating coils 82 thereof, and other suitable components may be controlled by a processing device such as a controller 85. Controller 85 may be in communication (via for example a suitable wired or wireless connection) to such components of the air conditioner unit 10. By way of example, the controller 85 may include a memory and one or more processing devices such as microprocessors, CPUs or the like, such as general or special purpose microprocessors operable to execute programming instructions or micro-control code associated with operation of unit 10. The memory may represent random access memory such as DRAM, or read only memory such as ROM or FLASH. In one embodiment, the processor executes programming instructions stored in memory. The memory may be a separate component from the processor or may be included onboard within the processor.

Unit 10 may additionally include a control panel 87 and one or more user inputs 89, which may be included in control panel 87. The user inputs 89 may be in communication with the controller 85. A user of the unit 10 may interact with the user inputs 89 to operate the unit 10, and user commands may be transmitted between the user inputs 89 and controller 85 to facilitate operation of the unit 10 based on such user commands. A display 88 may additionally be provided in the control panel 87, and may be in communication with the controller 85. Display 88 may, for example be a touchscreen or other text-readable display screen, or alternatively may simply be a light that can be activated and deactivated as required to provide an indication of, for example, an event or setting for the unit.

A power source 90 may supply power to the unit 10 generally, and specifically to the controller 85, fan 42 (and motor 72 thereof) and heater banks 80. Power source 90 may generally be any suitable electrical power source, such as a power cable that is connected to the various components of the unit 10. Power source 90 may interact with a power supply 92, such as the electrical grid, via for example a power outlet and suitable wiring as is generally understood. The power source 90 may thus generally provide the electrical communication between the power supply 92 and the unit 10 generally and components thereof.

Unit 10 may additionally include a temperature sensor 95, which may be disposed within the interior 51 of housing 46 to measure, for example, temperatures during a heating mode when the heating unit 44 generally is active and/or temperature during a cooling mode. Sensor 95 may be in communication with the controller 85, and may provide such temperature readings to the controller 85.

As discussed, improved methods and apparatus for reducing or preventing overheating of air conditioner units 10 during operation thereof would be advantageous. Accordingly, the present disclosure is further directed to methods for operating air conditioner units 10. It should further be understood that, in exemplary embodiments, a controller 85 in accordance with the present disclosure may be operable to perform the various methods steps as disclosed herein. Controller 85 may advantageously be in communication with, for example, the motor 72 and the heater banks 80 to facilitate such operation.

A method 200 may thus include, for example, the step 210 of determining an operational mode 212 for the air conditioner unit 10. The unit 10 may, for example, be operated in a cooling mode or a heating mode, as is generally understood. If it is determined that the air conditioner unit 10 is operating in a cooling mode, present operation of the unit 10 may simply be continued, with no further action taken with respect to presently disclosed methods. The continuation of present operation in accordance with the present disclosure is generally continuance of operation of the unit 10 in accordance with the present settings, with no adjustments in accordance with the present method. If it is determined that the air conditioner unit 10 is operating in a heating mode, further steps may be taken in accordance with the present disclosure.

Method 200 may further include, for example, the step 220 of determining an operational state 222 of each heater bank 80 of the air conditioner unit 10. In some embodiments, such as when step 210 is first performed, the step 220 may only occur when the operational mode 212 is a heating mode, as discussed above. The operational state 222 may, for example, be active or inactive. In an active state, the heater bank 80 is operating to provide heat, and in the inactive state, the heater bank 80 is not operating to provide heat.

In some cases, at least one of the plurality of heater banks 80 may be inactive. In some embodiments, method 200 may thus further include, for example, the step 225 of continuing present operation of the unit 10 when the operation state 222 of at least one heater bank 80 is inactive.

In other cases, the operational state 222 of each and every heater bank 80 may be active. Method 200 may thus further include, for example, the step 230 of determining a speed 232 of the blower fan 42. In some embodiments, such step 230 may only occur when the operational state of each heater bank 80 is active. Blower fan 42 may be operable at a variety of speeds 232, such as a low speed, one or more optional intermediate speeds, and a high speed.

In some embodiments, suitable components such as speed sensors, rotational frequency sensors, etc. may be utilized to determine the speed 232 of the blower fan 42. In other embodiments, step 230 may include the step 235 of determining a speed setting 237. As discussed above, the speed setting 237 for the fan 42 may, for example, be a low speed setting or a high speed setting or, optionally, one or more intermediate speed settings. The speed setting 237 may be selected by a user, and associated signals may be transmitted to the fan 42 (and specifically the motor 72 thereof) to operate the fan 42 at a speed 232 associated with that setting 237. Accordingly, when the speed setting 237 is a low speed setting, the speed 232 is a low speed. When the speed setting 237 is a high speed setting, the speed 232 is a high speed. When the speed setting 237 is an intermediate speed setting, the speed 232 is an intermediate speed. As such, by determining the speed setting 237, the speed 232 may additionally be determined.

In further embodiments, the speed setting 237 may be an automatic setting. The automatic setting is generally a setting that allows the speed 232 to be determined and adjusted based on other variable during operation, such as temperature differentials. Accordingly, in some embodiments, the step 230 of determining the speed 232 of the blower fan 42 may include the step 240 of comparing an actual temperature differential 242 to a differential threshold 244. In some embodiments, step 240 may occur only when the speed setting 237 is the automatic setting. The actual temperature differential 242 may be a difference in an actual temperature as measured by, for example, temperature sensor 95, and a desired temperature that is for example set by a user and saved in the controller 85. The differential threshold 244 is a predetermined temperature difference that is programmed into the controller 85. For example, if the actual temperature is less than or equal to the differential threshold, the fan 42 may be operated at one speed, and if the actual temperature is greater than the differential threshold 244, the fan 42 may be operated at a different speed. In some embodiments, for example, the speed 232 is a low speed when the actual temperature differential 242 is less than or equal to the differential threshold 244 and the speed 232 is a high speed when the actual temperature differential 242 is greater than the differential threshold 244.

Accordingly, the speed 232 of the fan 42 may be determined in accordance with the present disclosure. In some cases, the speed 232 may be a high speed or an intermediate speed. In some embodiments, method 200 may thus further include, for example, the step 245 of continuing present operation of the unit 10 when the speed 232 is a high speed or intermediate speed.

In other cases, the speed 232 may be a low speed. Method 200 may thus further include, for example, the step 250 of comparing a blower fan input voltage 252 to a blower fan voltage threshold value 254. In some embodiments, such step 250 may only occur when the speed 232 is a low speed. The blower fan input voltage 252 is the measured input voltage to the blower fan 42, such as to the motor 72 thereof. For example, a voltage sensor 100 may be connected to the motor 72 or to electrical wiring upstream of the motor 72 to measure such input voltage. The voltage sensor 100 may, for example, be in communication with the controller 85, and may transmit such input voltage 252 data to the controller 85. The blower fan voltage threshold value 254 is a predetermined voltage value that is programmed into the controller 85.

It should be noted that, in exemplary embodiments, the blower fan 42 may be operated, such as by the controller 85, at a generally constant input voltage when operating at one or more speeds 232. For example, blower fan 42 may operate at one generally constant input voltage when operating at the low speed. Blower fan 42 may operate at other generally constant input voltage when operating at the high speed or an intermediate speed. Accordingly, when the blower fan 42 is set to a particular speed, such as the low speed, the input voltage to the motor 72 may be generally constant despite changes in one or more other variables during operation, such as for example, input air flow to the blower fan 42.

Further, because the blower fan 42 is operating at a generally constant rotational frequency when operating at a particular speed, such as the low speed, the input voltage 252 may be adjusted in response to changes in input air flow. The controller 85 may, for example, be operable to cause such changes in input voltage 252. For example, if a blockage or some other event occurs such that the input air flow to or output air from the unit 10 generally or the fan 42 specifically is reduced, less torque may be required for the blower fan 42 to operate at a generally constant rotational frequency for a particular speed. The input voltage 252 may thus be adjusted in accordance with the present disclosure. For example, the input voltage 252 may be reduced in such event such that the generally constant rotational frequency is maintained for a particular speed.

Further, such information can be utilized when comparing the blower fan input voltage 252 to the blower fan voltage threshold value 254 such that blockages can be recognized and the unit 10 can respond appropriately. For example, in some cases, the blower fan input voltage 252 may be greater than or equal to the blower fan voltage threshold value 254. In these embodiments, method 200 may thus further include, for example, the step 255 of continuing present operation of the unit 10 when the blower fan input voltage 252 is greater than or equal to the blower fan voltage threshold value 254. In other cases, the blower fan input voltage 252 may be less than the blower fan voltage threshold value 254. Method 200 may thus further include, for example, the step 260 of deactivating one of the plurality of heater banks 80. In some embodiments, such step 260 may only occur when the blower fan input voltage 252 is less than the blower fan voltage threshold value 254. Advantageously, the risk of overheating of the unit 10 is thus reduced or eliminated by deactivating one of the plurality of heater banks 80 when it is detected that all heater banks 80 are active, the fan speed 232 is low, and the blower fan input voltage 252 is less than the blower fan voltage threshold value 254, thus indicating the presence or potential presence of a blockage.

In exemplary embodiments, the low power heater bank 80 is deactivated when the blower fan input voltage 252 is less than the blower fan voltage threshold value 254. Alternatively, however, the medium power heater bank 80, high power heater bank 80, or any other suitable heater bank(s) 80 may be deactivated when the blower fan input voltage 252 is less than the blower fan voltage threshold value 254.

In some embodiments, method 200 may additionally provide an indication that a blockage or potential blockage has been detected. For example, method 200 may further include the step 270 of transmitting a low air flow signal 272 when the blower fan input voltage 252 is less than the blower fan voltage threshold value 254. Such signal 272 may, for example, be transmitted by the controller 85 to, for example, the display 88. Such transmission, and resulting output provided by the display 88, may advantageously provide an indication to a user that a low air flow event, potentially due to a blockage, has occurred.

It should be noted that, in exemplary embodiments, the deactivated heater bank 80 may be re-activated when, for example, the speed 232 is changed from a low speed to another speed, such as a high speed, or when a blockage is removed from the inlet or outlet air flow.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating an air conditioner unit having a selectable high and low blower speed, the low speed being relatively less than the high speed, the method comprising:
   initiating a present operation;
   determining an operational state of each heater bank of a plurality of heater banks of the air conditioner unit, the plurality of heater banks comprising a low power heater bank and a high power heater bank;
   determining an operational rotation speed of a blower fan of the air conditioner unit when the operational state of every heater bank is active during the present operation;
   comparing a blower fan input voltage to a voltage threshold value when the determined operational rotation speed is the low speed;
   deactivating only the low power heater bank when the blower fan input voltage is less than the voltage threshold value; and
   continuing the present operation in response to the step of deactivating the low power heater bank.

2. The method of claim 1, further comprising continuing the present operation when the determined operational rotation speed is the high speed and every heater bank is active.

3. The method of claim 1, further comprising determining an operational mode for the air conditioner unit, and wherein the step of determining an operational state of each heater bank occurs when the operational mode is a heating mode.

4. The method of claim 1, wherein the step of determining the operational rotation speed of the blower fan comprises determining a speed setting.

5. The method of claim 4, wherein the determined operational rotation speed is the low speed when the speed setting is a low speed setting and the determined operational rotation speed is the high speed when the speed setting is a high speed setting.

6. The method of claim 4, wherein the step of determining the operational rotation speed of the blower fan comprises comparing an actual temperature differential to a differential threshold when the speed setting is an automatic setting, and wherein the determined operational rotation speed is the low speed when the actual temperature differential is less than or equal to the differential threshold and the determined operational rotation speed is the high speed when the actual temperature differential is greater than the differential threshold.

7. The method of claim 1, further comprising transmitting a low air flow signal when the blower fan input threshold is less than the voltage threshold value.

8. The method of claim 1, wherein the blower fan operates at a constant rotational frequency when operating at the low speed.

9. The method of claim 1, wherein the plurality of heater banks further comprises a medium power heater bank.

10. An air conditioner unit having a selectable high and low blower speed, the low speed being relatively less than the high speed, the air conditioner unit comprising:
- a blower fan, the blower fan comprising a blade assembly and a motor connected to the blade assembly;
- a heating unit, the heating unit comprising a plurality of heater banks, the plurality of heater banks comprising a low power heater bank and a high power heater bank;
- a power source in electrical communication with the blower fan motor and the plurality of heater banks; and
- a controller in operable communication with the motor and the plurality of heater banks, the controller operable for:
  - initiating a present operation;
  - determining an operational state of each heater bank;
  - determining an operational rotation speed of the blower fan when the operational state of every heater bank is active during the present operation;
  - comparing a blower fan input voltage to a voltage threshold value when the determined operational rotation speed is the low speed;
  - deactivating only the low power heater bank when the blower fan input voltage is less than the voltage threshold value; and
  - continuing the present operation in response to deactivating the low power heater bank.

11. The air conditioner unit of claim 10, wherein the controller is further operable for continuing the present operation when the determined operational rotation speed is the high speed and every heater bank is active.

12. The air conditioner unit of claim 10, wherein the controller is further operable for determining an operational mode for the air conditioner unit, and wherein determining an operational state of each heater bank occurs when the operational mode is a heating mode.

13. The air conditioner unit of claim 10, wherein determining the operational rotation speed of the blower fan comprises determining a speed setting.

14. The air conditioner unit of claim 13, wherein determining the operational rotation speed of the blower fan comprises comparing an actual temperature differential to a differential threshold when the speed setting is an automatic setting, and wherein the determined operational rotation speed is the low speed when the actual temperature differential is less than or equal to the differential threshold and the determined operational rotation speed is the high speed when the actual temperature differential is greater than the differential threshold.

15. The air conditioner unit of claim 10, wherein the controller is further operable for transmitting a low air flow signal when the blower fan input threshold is less than the voltage threshold value.

16. The air conditioner unit of claim 10, wherein the blower fan operates at a constant input voltage when operating at the low speed.

17. The air conditioner unit of claim 10, wherein the plurality of heater banks further comprises a medium power heater bank.

18. A method for operating an air conditioner unit having a selectable high and low blower speed, the low speed being relatively less than the high speed, the method comprising:
- initiating a present operation;
- determining an operational state of each heater bank of a plurality of heater banks of the air conditioner unit during the present operation;
- determining an operational rotation speed of a blower fan of the air conditioner unit when the operational state of every heater bank is determined to be active;
- comparing a blower fan input voltage to a voltage threshold value in response to the step of determining an operational rotation speed when the determined operational rotation speed is the low speed;
- deactivating only one of the plurality of heater banks when the blower fan input voltage is less than the voltage threshold value;
- continuing the present operation in response to the step of deactivating only one of the plurality of heater banks; and
- continuing the present operation in response to the step of determining an operational state of each heater bank when the determined operational rotation speed is the high speed and every heater bank is active.

* * * * *